US011317717B1

(12) United States Patent
Nuss (10) Patent No.: US 11,317,717 B1
(45) Date of Patent: May 3, 2022

(54) TILT FRONT DRAWER WITH LOCKING SLIDE

(71) Applicant: Haier US Appliance Solutions, Inc., Wilmington, DE (US)

(72) Inventor: Bart Andrew Nuss, Fisherville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/088,788

(22) Filed: Nov. 4, 2020

(51) Int. Cl.
| | | |
|---|---|---|
| *F25D 23/02* | (2006.01) |
| *A47B 88/956* | (2017.01) |
| *F16C 29/02* | (2006.01) |
| *A47B 88/40* | (2017.01) |
| *F25D 25/02* | (2006.01) |
| *A47B 88/50* | (2017.01) |
| *A47B 88/53* | (2017.01) |
| *E05B 65/46* | (2017.01) |
| *A47B 88/95* | (2017.01) |

(52) U.S. Cl.
CPC ............ *A47B 88/956* (2017.01); *A47B 88/40* (2017.01); *A47B 88/50* (2017.01); *A47B 88/53* (2017.01); *E05B 65/46* (2013.01); *F16C 29/02* (2013.01); *F25D 23/028* (2013.01); *F25D 25/025* (2013.01); *A47B 2088/954* (2017.01); *F25D 2325/021* (2013.01)

(58) Field of Classification Search
CPC ....... A47B 88/956; A47B 88/50; A47B 88/53; A47B 88/40; A47B 2088/954; F25D 25/025; F25D 23/028; F25D 2325/021; F16C 29/02; E05B 65/46
See application file for complete search history.

(56) References Cited

U.S. PATENT DOCUMENTS

| | | | | |
|---|---|---|---|---|
| 3,033,637 | A * | 5/1962 | Van Donk | B42F 17/14 312/303 |
| 7,467,834 | B2 * | 12/2008 | Kim | F25D 23/021 312/402 |
| 8,231,190 | B2 | 7/2012 | Ertz | |
| 8,523,301 | B1 * | 9/2013 | Britson | A47B 88/40 312/333 |
| 8,955,352 | B2 * | 2/2015 | Lee | F25D 23/02 62/441 |
| 10,119,219 | B2 * | 11/2018 | Lee | D06F 37/42 |
| 10,281,194 | B2 * | 5/2019 | Choo | E05B 7/00 |
| 10,362,870 | B1 * | 7/2019 | Smith | A47B 88/407 |
| 10,443,271 | B1 * | 10/2019 | Rose | A47B 88/50 |

(Continued)

FOREIGN PATENT DOCUMENTS

| | | |
|---|---|---|
| CN | 107763954 A | 3/2018 |
| JP | 2004191039 A | 7/2004 |

*Primary Examiner* — Hanh V Tran
(74) *Attorney, Agent, or Firm* — Dority & Manning, P.A.

(57) ABSTRACT

A drawer assembly for an appliance includes a drawer front providing selective access to a drawer recess, a handle assembly attached to the drawer front, and a slide assembly attached to the drawer front. The slide assembly includes a fixed slide mounted to the appliance, a sliding support coupling the drawer front to the fixed slide, and a catch lever operably coupled to the fixed slide and the sliding support. The catch lever is movable between an engaged position and a disengaged position to selectively fix the sliding support relative to the fixed slide.

19 Claims, 6 Drawing Sheets

(56) References Cited

U.S. PATENT DOCUMENTS

| | | | |
|---|---|---|---|
| 10,578,351 B1* | 3/2020 | Nuss | F25D 25/025 |
| 10,712,082 B1* | 7/2020 | Nuss | F25D 25/025 |
| 10,731,917 B1* | 8/2020 | Nuss | F25D 23/028 |
| 2004/0183415 A1* | 9/2004 | Kim | F25D 25/025 |
| | | | 312/402 |
| 2007/0035222 A1* | 2/2007 | Lee | F25D 23/021 |
| | | | 312/405 |
| 2009/0193836 A1* | 8/2009 | Ertz | F25D 25/025 |
| | | | 62/449 |
| 2010/0090575 A1* | 4/2010 | Uthuppan | F25D 25/025 |
| | | | 312/404 |
| 2016/0209102 A1* | 7/2016 | Vulava | E05D 15/00 |
| 2018/0014638 A1* | 1/2018 | Hanley | A47B 46/005 |

* cited by examiner

TILT FRONT DRAWER WITH LOCKING SLIDE

FIELD OF THE INVENTION

The present subject matter relates generally to drawers for appliances, and more particularly to drawer handles and slide mechanisms with locking features.

BACKGROUND OF THE INVENTION

Various types of consumer appliances are designed with pull-out compartment drawers. For example, a number of popular refrigerator styles have freezer compartments with one or more pull-out drawers that span the width of the appliance and include storage baskets or bins. Moreover, a number of popular refrigerators have an additional drawer having a shallower depth and typically provided above the freezer compartment. The conventional pull-out drawers typically include side brackets that are mounted to slides of a slide mechanism that, in turn, has a base member mounted to the compartment liner.

Some of the shallow-depth drawers may include a front portion that is able to tilt, e.g., in a forward direction, allowing a user to remove items without having to open the drawer to its maximum withdrawal distance. However, problems exist in that when the front portion is tilted downward and the drawer is retracted inward, damage may occur to the front portion and/or the freezer door located beneath the shallow-depth drawer. Accordingly, it would be beneficial to have a tilting drawer front with a locking mechanism to obviate one or more of these drawbacks.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a drawer assembly for an appliance is provided, the appliance including a cabinet defining a drawer recess. The drawer assembly may include a drawer front for providing selective access to the drawer recess, a handle assembly attached to the drawer front, and a slide assembly operably coupling the drawer to the cabinet. The slide assembly may include a fixed slide mounted to the cabinet, the fixed slide defining a receiving slot; a sliding support slidably coupling the drawer front to the fixed slide; and a catch lever operably coupled to the fixed slide and the sliding support, the catch lever being movable between an engaged position where the sliding support is fixed relative to the fixed slide and a disengaged position where the sliding support is slidable relative to the fixed slide.

In another exemplary aspect of the present disclosure, a refrigerator appliance is provided, the refrigerator appliance including a cabinet defining a fresh food storage chamber and a frozen food storage chamber, and a drawer slidably mounted within one of the fresh food storage chamber and the frozen food storage chamber and defining a drawer recess. The drawer may include a drawer front for providing selective access to the drawer recess, a handle assembly attached to the drawer front, and a slide assembly operably coupling the drawer to the cabinet. The slide assembly may include a fixed slide mounted to the cabinet, the fixed slide defining a receiving slot; a sliding support slidably coupling the drawer front to the fixed slide; and a catch lever operably coupled to the fixed slide and the sliding support, the catch lever being movable between an engaged position where the sliding support is fixed relative to the fixed slide and a disengaged position where the sliding support is slidable relative to the fixed slide.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees either clockwise or counterclockwise with the vertical direction V.

Figure 1:
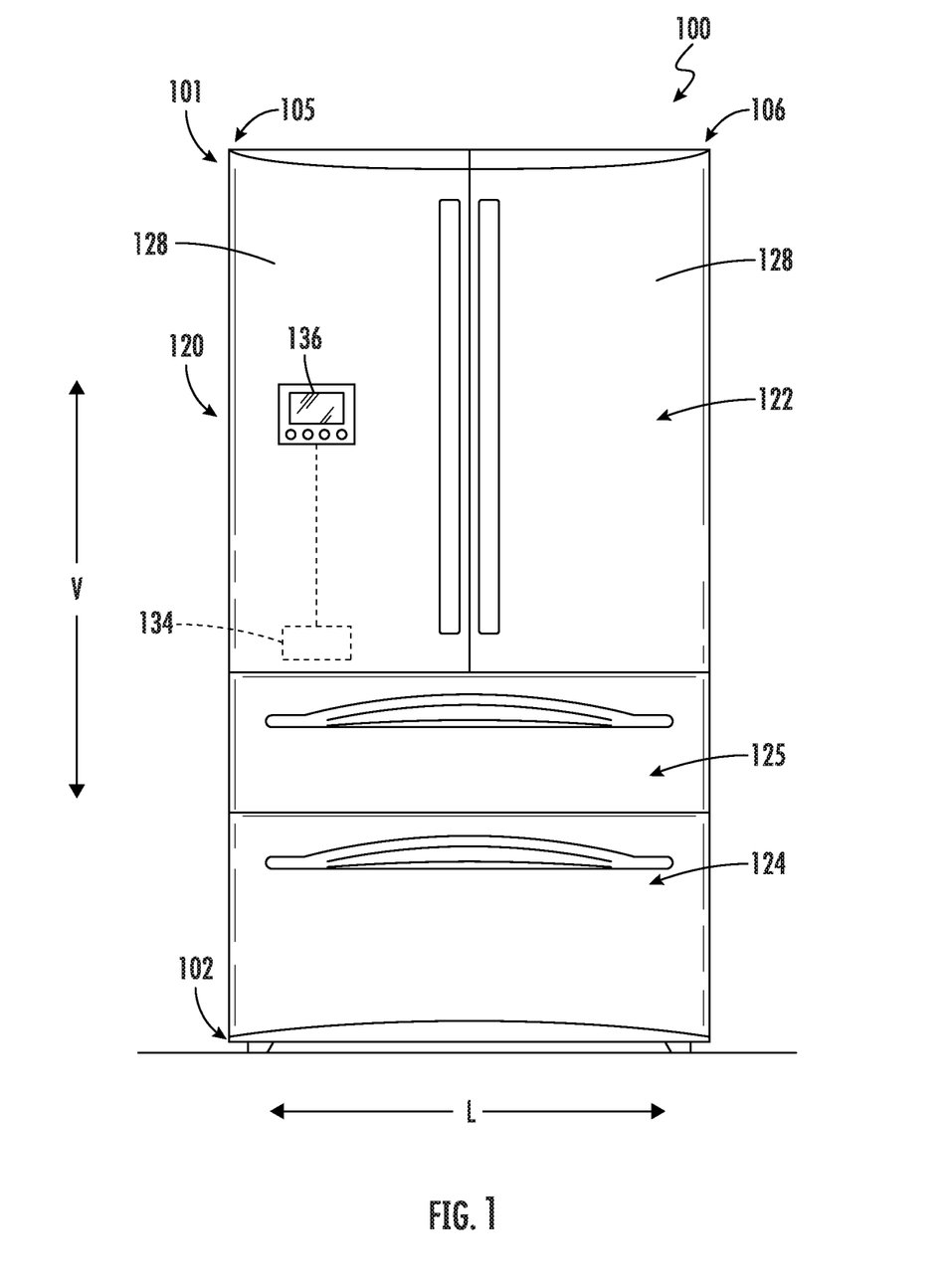
FIG. 1 provides a front view of a refrigerator appliance according to exemplary embodiments of the present disclosure.
Figure 2:
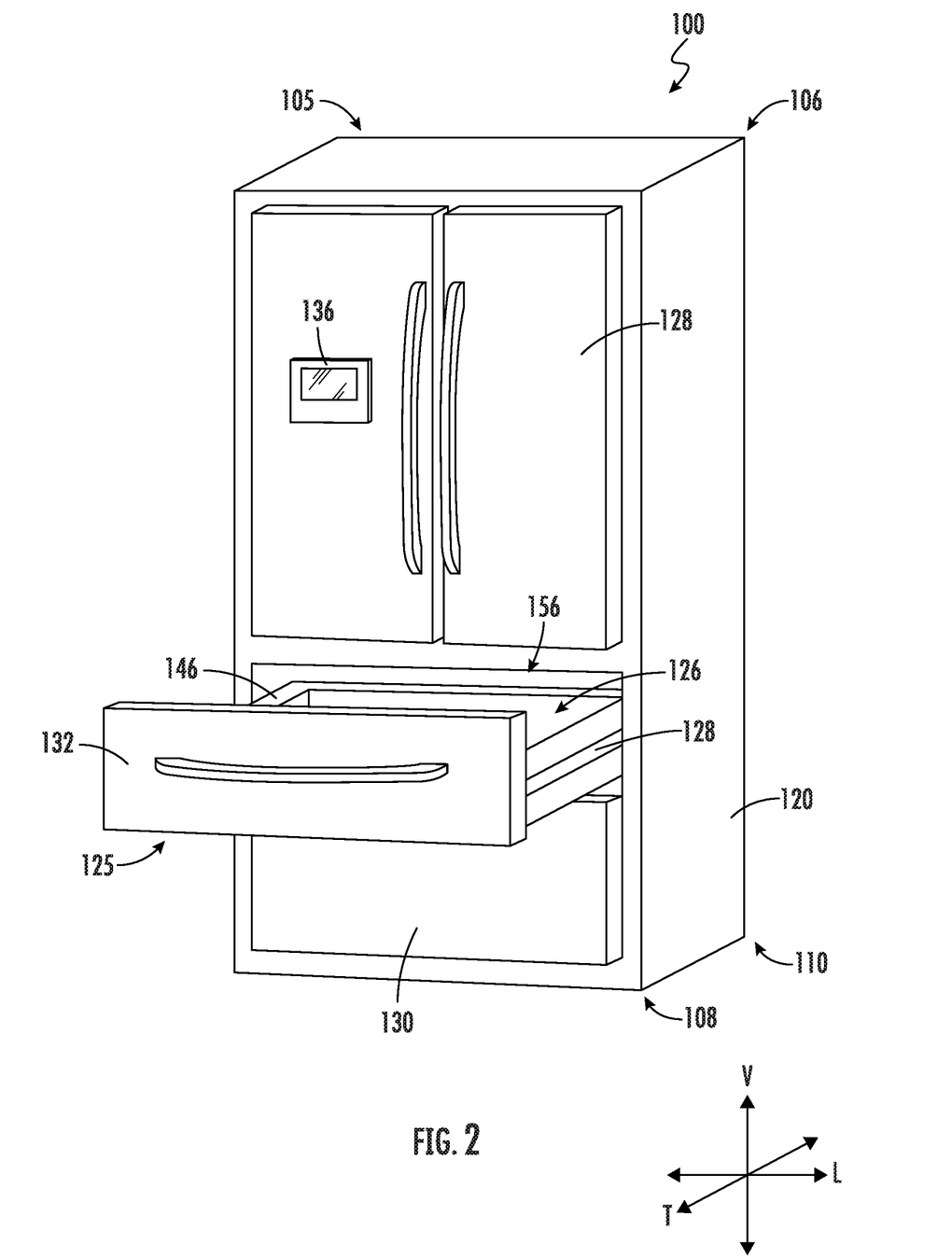
FIG. 2 provides a perspective view of the refrigerator appliance of FIG. 1 with a drawer thereof in an open position and a door of the drawer in a closed position.
Figure 3:
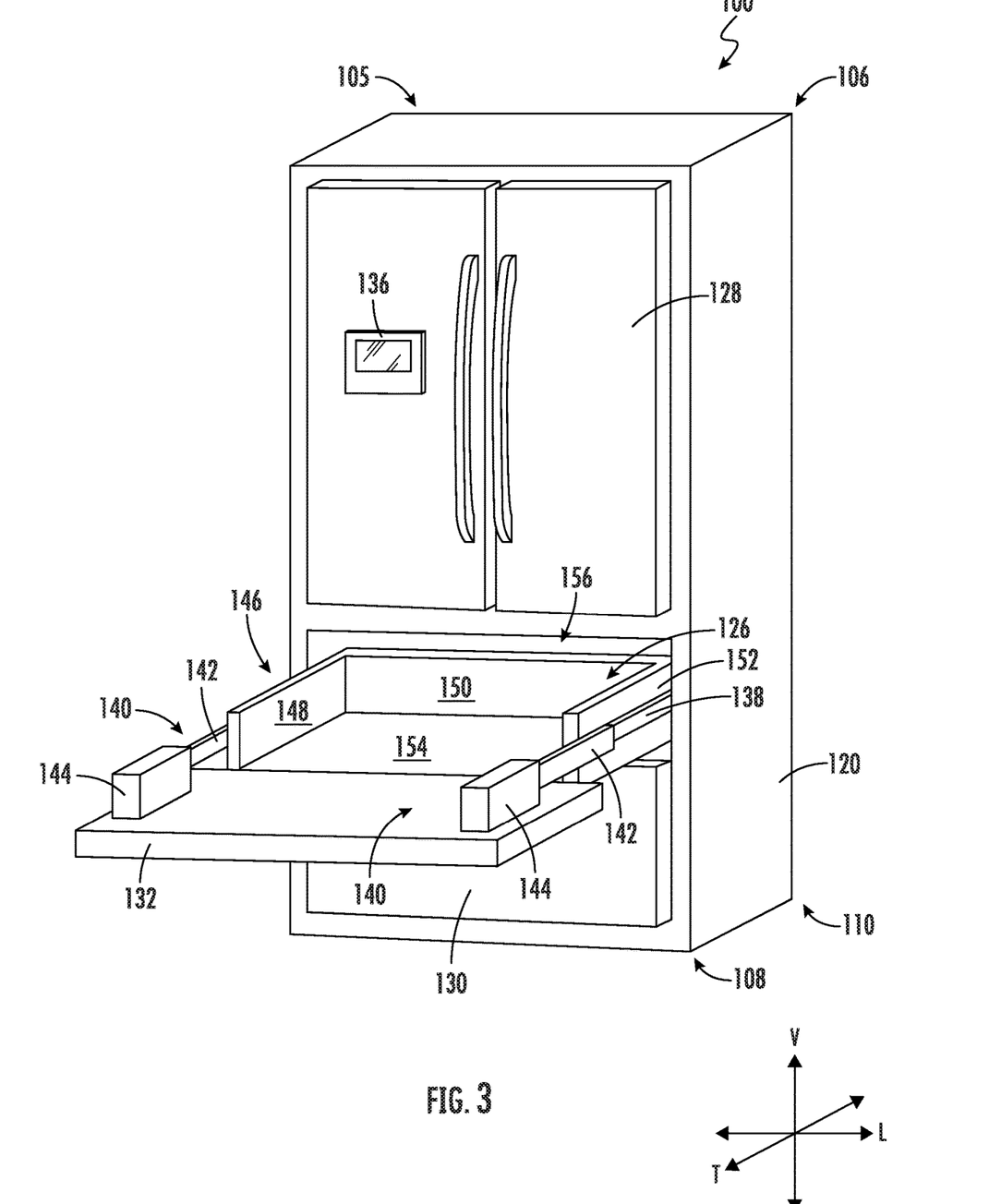
FIG. 3 provides a perspective view of the refrigerator appliance of FIG. 2 with the door of the drawer in an open position.

FIG. 1 is a front view of an exemplary embodiment of a refrigerator appliance 100. FIG. 2 is a perspective view of the refrigerator appliance 100 having a drawer 125 in an open position to reveal the interior 126 of the drawer 125. FIG. 3 is a perspective view of the refrigerator appliance 100 having a drawer front 132 of the drawer 125 in an open position to promote access to the interior 126 of the drawer 125. Refrigerator appliance 100 extends between a top 101 and a bottom 102 along a vertical direction V. Refrigerator appliance 100 also extends between a left side 105 and a right side 106 along a lateral direction L. As shown in FIGS. 2 and 3, a transverse direction T may additionally be defined perpendicular to the vertical and lateral directions V, L. Refrigerator appliance 100 extends along the transverse direction T between a front portion 108 and a back portion 110.

Refrigerator appliance 100 includes a cabinet or housing 120 defining an upper fresh food chamber 122 and a lower freezer chamber or frozen food storage chamber 124 arranged below the fresh food chamber 122 along the vertical direction V. Because the frozen food storage chamber 124 is positioned below the fresh food storage chamber 122, refrigerator appliance 100 is generally referred to as a bottom mount refrigerator. Using the teachings disclosed herein, one of skill in the art will understand that the present technology can be used with other types of refrigerators (e.g., side-by-sides) or a freezer appliance as well. Consequently, the description set forth herein is for illustrative purposes only and is not intended to limit the technology in any aspect. Indeed, it should be appreciated that aspects of the drawer assembly described herein may be used in any other suitable appliance, cabinetry, or other application where a drawer is needed for selective access to a compartment.

Refrigerator doors 128 are rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 128 for accessing freezer chamber 124.

Operation of the refrigerator appliance 100 can be regulated by a controller 134 that is operatively coupled to a user interface panel 136. Panel 136 provides selections for user manipulation of the operation of refrigerator appliance 100 such as e.g., temperature selections. In response to user manipulation of the user interface panel 136, the controller 134 operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 134 may be positioned in a variety of locations throughout refrigerator appliance 100. In the illustrated embodiment, the controller 134 may be located within one of the doors 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 134 via one or more signal lines or shared communication busses.

FIGS. 2 and 3 illustrate one example embodiment of a drawer assembly, referred to herein as a drawer 125 for the refrigerator appliance 100. The drawer 125 may be slidably mounted within the cabinet 120, e.g., with slides 138. In the illustrated example, the drawer 125 is a freezer drawer slidably mounted within the frozen food storage chamber 124 of the refrigerator appliance 100. Accordingly, the drawer 125 may assist with storing and providing access to frozen food items. For example, smaller food items such as a bag of frozen vegetables may be stored in the freezer drawer 125 to prevent or reduce such items from being obscured under or behind larger items such as a frozen turkey, etc., as compared to when only a single portion of the refrigerator appliance 100 is provided for storing frozen items. In other embodiments, the drawer 125 may be slidably mounted within the fresh food storage chamber 122 and may provide similar advantages with respect to storing and accessing fresh food items.

As will be described in more detail below, the drawer 125 may have a tilt out drawer front, e.g., the drawer front 132 of the drawer 125 may be connected to a drawer body 146 with a hinge or hinge assembly 140 such that the drawer front 132 is rotatable relative to the drawer body 146. Further, the hinge assembly 140 may include a damper assembly 144 which may dampen a rotation of the drawer front 132 at least from a closed position (FIG. 2) to an open position (FIG. 3).

As best seen in FIG. 3, the drawer 125 may include a drawer body 146 which includes a left wall 148, a back wall 150, a right wall 152, and a floor 154. The drawer body 146 may be received within a drawer recess 156 defined in the cabinet 120 of refrigerator appliance 100. The drawer body 146 at least partially defines an interior 126 of the drawer 125 which may provide a storage volume, e.g., for food items. To promote accessibility of such food items which may be stored within the interior 126 of the drawer 125, the drawer front 132 of the drawer 125 may be rotatable relative to the drawer body 146, to an open position as shown in FIG. 3. The drawer front 132 may be rotatable relative to the drawer body 146 in that the drawer front 132 may be connected to the drawer body 146 by one or more hinges 140.

Figure 7:
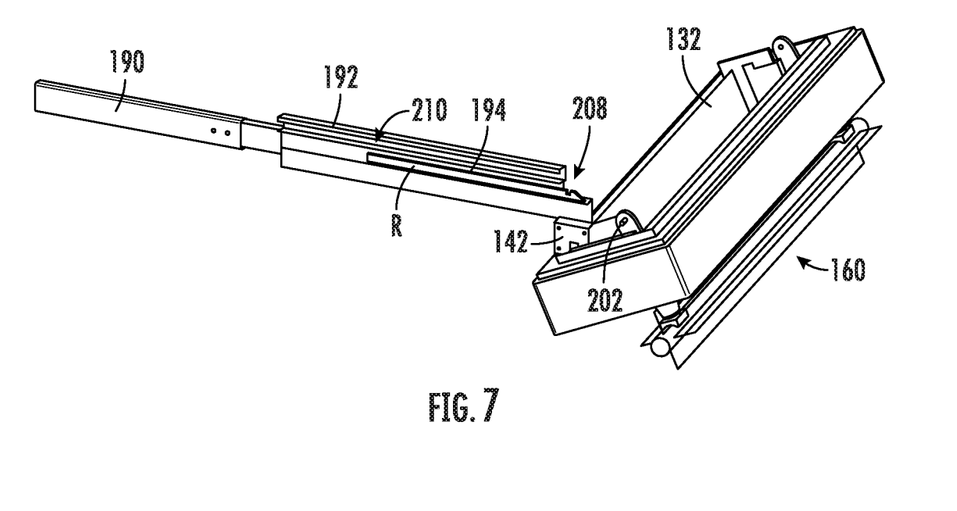
FIG. 7 provides a perspective view of a slide assembly of the refrigerator appliance of FIG. 2.

For example, the drawer front 132 may be connected to the drawer body 146 by a pair of hinges or hinge assemblies 140, such as a left hinge or hinge assembly 140 connected to the left side wall 148 of the drawer body 146 by a pivot arm 142 of the left hinge 140 and a right hinge or hinge assembly 140 connected to the right side wall 152 of the drawer body 146 by a pivot arm 142 of the right hinge 140. In some embodiments, the drawer 125 may be slidably mounted within the cabinet 120, e.g., within one of the fresh food storage 122 chamber and the frozen food storage chamber 124, by a left slide assembly 138 on the left side wall 148 and a right slide assembly 138 on the right side wall 152, such that the drawer 125 can slide between the closed position of the drawer 125 (FIG. 1) and the open position of the drawer 125 (FIGS. 2 and 3). Additionally one or more gaskets may be provided on the drawer front 132 of the drawer 125 to sealingly engage the cabinet 120 when the drawer 125 is in the closed position. Pivot arms 142 (FIG. 7) of the hinges 140 may each be connected to a corresponding slide assembly 138 at each side wall of the drawer body 146. The hinge 140, or each hinge 140 in the pair of hinges 140, may include a damper assembly 144 configured to dampen rotation of the drawer front 132 from the closed position (FIG. 2) to the open position (FIG. 3). Only one pivot arm 142 is shown in FIG. 7, however it should be understood that a second pivot arm may be included as warranted by certain embodiments.

Figure 4:
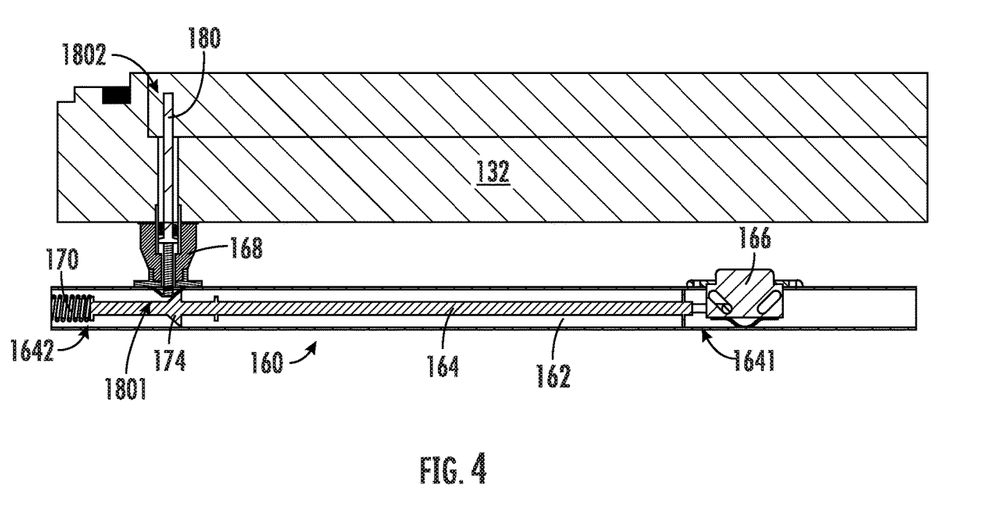
FIG. 4 provides a cut-away top view of a drawer front of the refrigerator appliance of FIG. 2 including a handle assembly.

FIG. 4 illustrates a drawer front 132 and handle assembly 160 according to an exemplary embodiment of the disclosure. The handle assembly 160 may include a handle body 162. The handle body 162 may be a cylindrical body extending in the lateral direction. The handle body 162 may be spaced from the drawer front 132 by a predetermined distance such that a user may grasp the handle body 162 to open drawer 125. It should be appreciated that the handle body 162 may have any suitable shape that allows a user to grasp handle body 162. Additionally or alternatively, handle body 162 may be integral with drawer front 132. In other words, handle body 162 may be formed directly into drawer front 132 as one unitary piece.

Handle assembly 160 may further include a connecting post 168. Connecting post 168 may connect handle body 162 to drawer front 132. Connecting post 168 may extend from a front surface of drawer front 132 in the transverse direction. Accordingly, connecting post 168 may define a space between handle body 162 and drawer front 132 to allow a user to grasp handle body 162. Connecting post 168 may further define a through hole provided axially through connecting post 168 in the transverse direction. In other words, the through hole may run through connecting post 168 from handle body 168 to drawer front 132.

Handle assembly 160 may further include a rod 164 provided within handle body 162. Rod 164 may extend laterally within the handle body 162. Rod 164 may be movable within the handle body 162. For instance, rod 164 may be movable in the lateral direction L within handle body 162 (e.g., rod 164 may translate axially within handle body 162). In some embodiments, rod 164 is rotatable within handle body 162. In other words, rod 164 may be rotatable about an axis defined in the lateral direction within handle body 162. Rod 164 may include a first end 1641 and a second end 1642 opposite the first end 1641. For instance, first end 1641 of rod 164 may be located at or near a center of handle body 162. In some embodiments, two rods 164 are provided within handle body 162. The two rods 164 may positioned axially adjacent to each other. In other words, each of the two rods may extend in the lateral direction L within handle body 162. The two rods 164 may be configured to move in opposite directions from each other in the lateral direction L.

Rod 164 may include a trigger pin 178 provided at a first end of rod 164. Trigger pin 178 may extend from rod 164 in a normal direction (i.e., radially) with respect to rod 164 (i.e., with respect to the lateral direction L). In one embodiment, trigger pin 178 extends radially from rod 164 in the vertical direction V. Trigger pin 178 may be contained within handle body 162. In detail, trigger pin may not protrude outside of handle body 162. Rod 164 may further include a rod spring 170 provided within handle body 162. Rod spring 170 may be a resilient member that abuts a distal end of rod 164 (i.e., a lateral end of rod 164).

Figure 5:
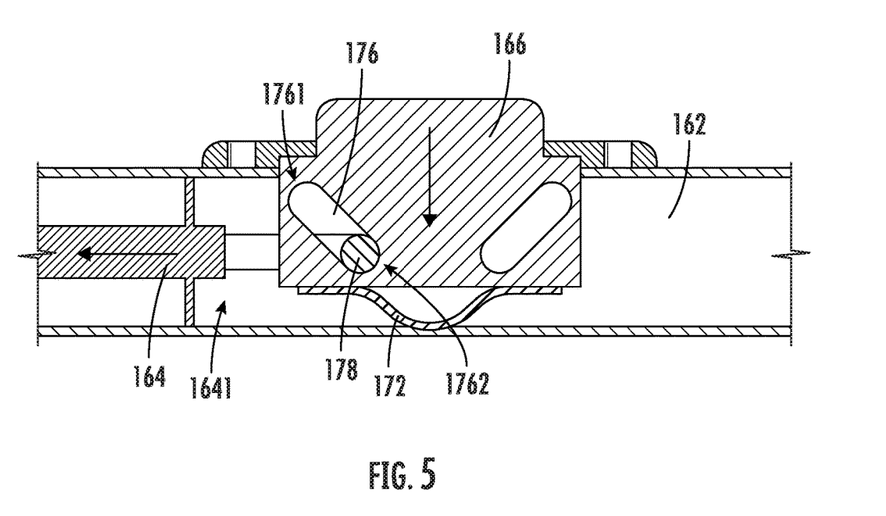
FIG. 5 provides a cut-away top view of a handle trigger of the handle assembly of FIG. 4.

Handle assembly 160 may further include a trigger 166 provided within handle body 162. In some embodiments, trigger 166 is located at or near a center of handle body 162. Trigger 166 may be a push lever. For example, trigger 166 may be movable with respect to handle body 162. In some embodiments, trigger 166 is movable in the normal direction (or perpendicular) within handle body 162 (e.g., a user may squeeze trigger 166 into handle body 162). In detail, trigger 166 may be movable in the transverse direction. Trigger 166 may include a trigger spring 172 provided within handle body 162. Trigger spring 172 may be a resilient member biasing trigger 166 against handle body 162. For instance, trigger spring 172 may provide a biasing force to urge trigger 166 in a direction away from handle body 162. In some embodiments, trigger spring 172 is a leaf spring. Accordingly, a first portion of trigger spring 172 may contact an inner circumferential surface of handle body 162, and a second portion of trigger spring 172 may contact an inner surface of trigger 166 (i.e., a portion of trigger 166 that is located within handle body 162, as seen in FIG. 5).

Trigger 166 may further include a slot 176 defined therein. Slot 176 may be formed as an elongated hole through trigger 166. In some embodiments, slot 176 is formed through trigger 166 in the vertical direction V. Slot 176 may be configured to accommodate trigger pin 178 therein. For instance, trigger pin 178 may pass through trigger 166 via slot 176. Slot 176 may be angled with respect to handle body 162 (i.e., with respect to the lateral direction L). For instance, slot 176 may include a first end 1761 and a second end 1762 opposite first end 1761. First end 1761 may be positioned closer to second end 1642 of rod 1641. Additionally or alternatively, first end 1761 may be positioned closer to cabinet 120. As such, a long axis of slot 176 may extend at an angle with respect to the handle body 162 (i.e., the lateral direction L). In some embodiments, the long axis of slot 176 may extend at an angle of about 45° with respect to handle body 162.

Figure 6:
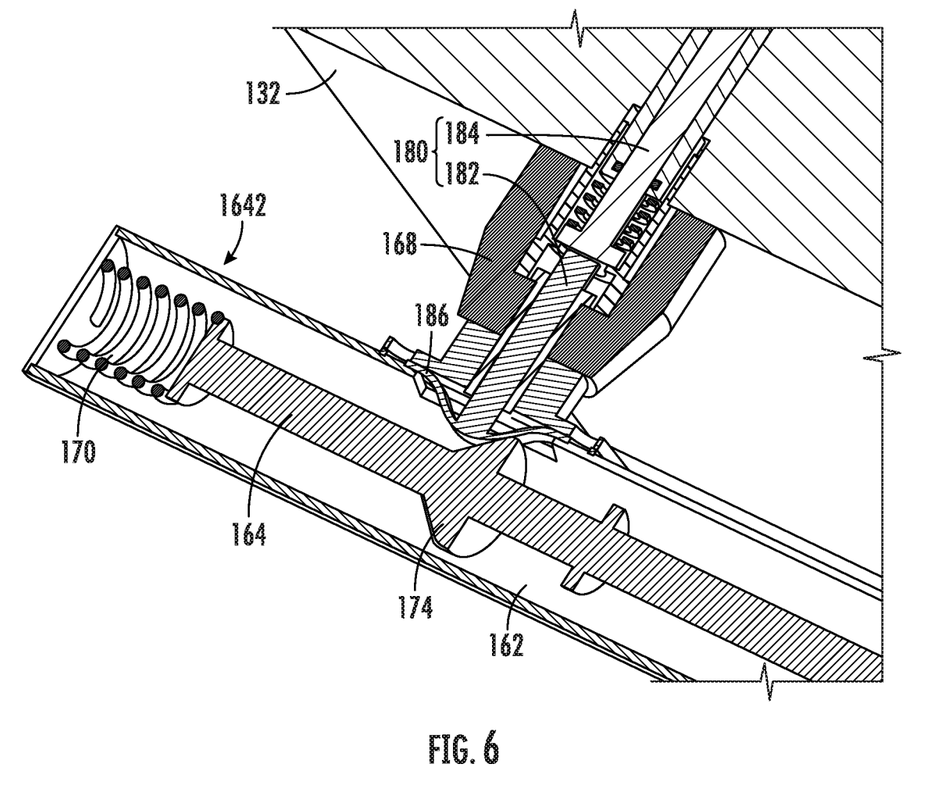
FIG. 6 provides a cut-away perspective view of a plunger assembly of the handle assembly of FIG. 4.

As seen particularly in FIG. 6, rod 164 may include a protrusion 174. Protrusion 174 may protrude radially from rod 164. In some embodiments, protrusion 174 is cone shaped. In detail, protrusion 174 may be shaped such that a first diameter (e.g., of rod 164) nearest the second end 1642 of rod 164 is smaller than a second diameter (e.g., of rod 164) nearest the first end 1641 of rod 164. Protrusion 174 may have any other suitable shape, however.

The drawer 125 may include an actuating mechanism. The actuating mechanism may allow the slide (or slides) 138 to be locked in place when drawer front 132 is tilted away from drawer body 146. The actuating mechanism may include a plunger assembly 180. Plunger assembly 180 may be a rod that passes through drawer front 132 and connecting post 168 into handle body 162. Plunger assembly 180 may include a first end 1801 located in or at handle body 162, and a second end 1802 protruding through drawer front 132. First end 1801 of plunger assembly 180 may be in contact with rod 164 within handle body 162. Specifically, first end 1801 may be in contact with protrusion 174 located on rod 164.

Accordingly, when rod 164 is moved from a first position to a second position within handle body 162, plunger assembly 180 may also be moved from a first position to a second position through drawer front 132. Specifically, when a user depresses trigger 166, trigger pin 178 may be pushed in a first direction (e.g., laterally) by angled slot 176. Consequently, rod 164 may be moved in the first direction (e.g., laterally) within handle body. When rod 164 is moved (i.e., translated laterally), protrusion 174 pushes plunger assembly 180 in a second direction (e.g., transversely). The second direction may be substantially perpendicular to the first direction. Accordingly, plunger assembly 180 may be moved (i.e., translated transversely) toward drawer interior 126.

In some embodiments, plunger assembly 180 includes a first plunger bar 182 and a second plunger bar 184. First plunger bar 182 and second plunger bar 184 may be axially aligned and may abut each other within connecting post 168. In other words, first plunger bar 182 may abut second plunger bar 184 within connecting post 168.

Plunger assembly 180 may be biased by a plunger spring 186. For instance, plunger spring 186 may be a resilient member provided within handle body 162. Plunger spring 186 may be a leaf-type spring configured to bias plunger assembly 180 away from drawer interior 126. Protrusion 174 on rod 164 may press against plunger spring 186 to urge plunger assembly 180 toward drawer interior 126.

Figure 8:
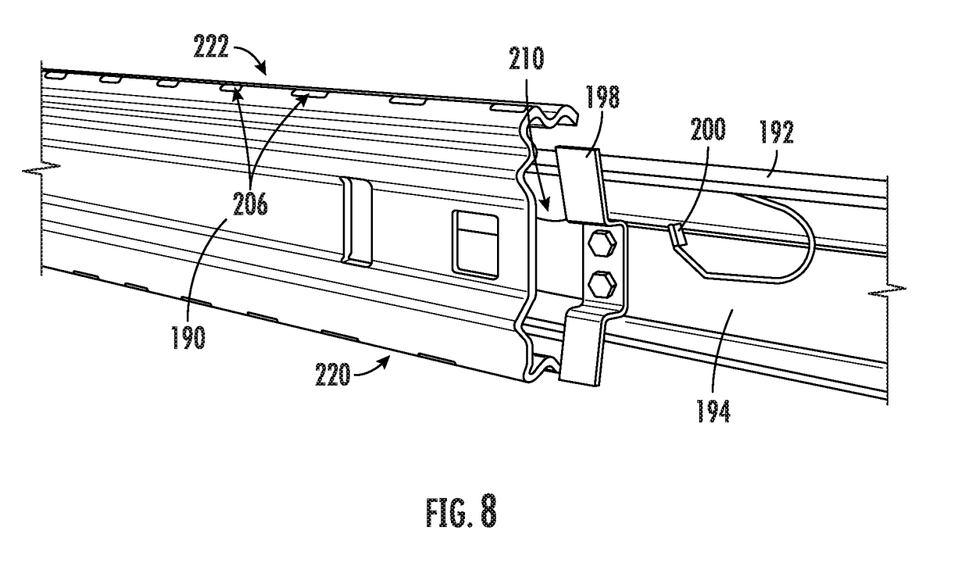
FIG. 8 provides a perspective view of a locking slide and catch lever of the slide assembly of FIG. 7.
Figure 9:
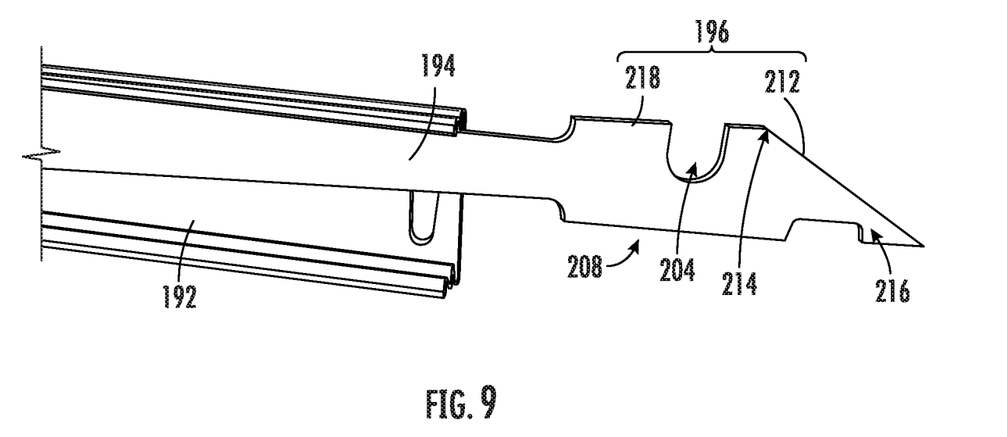
FIG. 9 provides a perspective view of the catch lever of the slide assembly of FIG. 7.

FIGS. 7 through 9 provide perspective views of slide assembly 138. Slide assembly 138 may be a multi-stage slide. For instance, slide assembly 138 may include a fixed slide 190, a sliding support 192, and a catch lever (or locking slide) 194. It should be noted that the number of stages included in slide assembly 138 is not limited, and may include more or fewer stages as applications warrant. Fixed slide 190 may be attached to cabinet 120 of refrigerator appliance 100. For instance, fixed slide 190 may be fastened to an interior of cabinet 100 (i.e., in fresh food chamber 122 or frozen food chamber 124). Fixed slide 190 may be fastened using standard means in the art, such as fasteners, clips, adhesives, or the like. In some embodiments, a plurality of fixed slides 190 may be incorporated, wherein a fixed slide 190 is attached to each lateral side of cabinet 120.

Sliding support 192 may be attached to drawer body 146. Sliding support 192 may be slidably received within fixed slide 190. In detail, sliding support 192 may slide with respect to fixed slide 190, allowing drawer 125 to be withdrawn from and inserted to cabinet 120. Similar to fixed slide 190, sliding support 192 may be fastened using standard means in the art, such as fasteners, clips, adhesives, or the like. In some embodiments, sliding support 192 is fixed to left wall 148 of drawer body 146. Of course, sliding support 192 may be fixed to right wall 152. Additionally or alternatively, a plurality of sliding supports 192 may be incorporated, wherein a sliding support 192 is fixed to each of left wall 148 and right wall 152. Sliding support 192 may include pivot arm 142, which allows drawer front 132 to pivot with respect to sliding support 192. As shown in FIG. 7, pivot arm 142 may attach sliding support 192 to a bottom of drawer front 132. However, the location of the connection between pivot arm 142 and drawer front 132 is not limited.

Catch lever 194 may be connected to sliding support 192. For example, catch lever 194 is rotatably connected to sliding support 192. In detail, catch lever 194 may be configured to rotate about a rotational axis R defined along a horizontal axis (e.g., an axis defined in the lateral direction) with respect to sliding support 192. Catch lever 194 may define a first end 208 and a second end 210 opposite first end 208. The rotational axis R may be located a predetermined distance away from second end 210 (i.e., toward a center of catch lever 194). Accordingly, each of first end 208 and second end 210 of catch lever 194 may be movable in the vertical direction as catch lever 194 rotates about the rotational axis R.

First end 208 of catch lever 208 may be located proximate drawer front 132. First end 208 may contact plunger assembly 180 when drawer front 132 is in the closed position. A first portion 212 of a top edge 196 of first end 208 of catch lever 194 may be angled such that a first point 216 of top edge 196 proximate drawer front 132 is lower than a second point 214 of top edge 196 in the vertical direction. Accordingly, when plunger assembly 180 is moved in the transverse direction T (i.e., toward the drawer interior 126), plunger assembly 180 may push top edge 196 of first end 208 of catch lever 194 in the vertical direction V (e.g., downward). Consequently, second end 210 of catch lever 194 may be moved in the vertical direction V (e.g., upward).

A locking notch 204 may be defined in a second portion 218 of top edge 196 of first end 208 of catch lever 194. Locking notch 204 may be a groove formed through catch lever 194, and may be configured to accept locking pin 202 of drawer front 132. Thus, when drawer front 132 is in the closed position, locking pin 202 is received in locking notch 204. Advantageously, the mating between locking pin 202 and locking notch 204 may retain drawer front 132 in the closed position without falling open unexpectedly. Additionally or alternatively, the mating between locking pin 202 and locking notch 204 may position catch lever 194 in a central position within sliding support 192. When catch lever 194 is in the central position, first end 208 may be located in a vertically central position within sliding support 192. The central position further indicates an unlocked state, or disengaged position, which will be explained in more detail below.

Second end 210 of catch lever 194 may be provided distal the drawer front 132. A locking tab 198 may extend from the catch lever 194 proximate the second end 210. Locking tab 198 may extend substantially in the vertical direction V. In some embodiments, two locking tabs 198 are provided, each extending in the vertical direction V opposite each other (e.g., one upward, one downward).

Fixed slide 190 may include a plurality of notches 206 formed therein. Notches 206 may be formed through a bottom edge 220 of fixed slide 190. Additionally or alternatively, notches may be formed through a top edge 222 of fixed slide 190. Notches 206 may be formed to accept locking tab 198 therein. For example, when drawer front 132 is in the open position, locking tab 198 is inserted into one of the plurality of notches 206. As a result, catch lever 194 and sliding support 192 are fixed with respect to fixed slide 190 and, consequently, drawer body 146. In some embodiments, catch lever 194 can be extended such that locking tab 198 is removed from fixed slide 190 (i.e., locking tab 198 is positioned in front of fixed slide 190 in the transverse direction T). In this case, locking tab 198 may engage a front surface of fixed slide 190, thus locking catch lever 194 with respect to locking slide 190 and preventing drawer front 132 from being pushed to a closed position.

Slide assembly 138 may further include a catch lever spring 200. Catch lever spring 200 may be a resilient member positioned between catch lever 194 and sliding support 192. Catch lever spring 200 may bias second end 210 of catch lever 194 in the vertical direction (e.g., downward). Catch lever spring 200 may be any sufficient resilient member, such as a coil spring, a leaf spring, a torsion spring, or the like. When drawer front 132 is in the open position (i.e., locking pin 202 is not received within locking notch 204), catch lever spring 200 may bias second end 210 downward in the vertical direction such that locking tab 198 is inserted into one of the plurality of notches 206. This may be referred to as a locked position, or an engaged position. When drawer front 132 is in the closed position (i.e., locking pin 202 is received within locking notch 204), catch lever 194 may be in the disengaged position. In other words, no locking tab 198 is received in any of the plurality of notches 206. This may also be referred to as a central position of catch lever 194. Accordingly, catch lever 194 and sliding support 192 are free to slide with respect to fixed slide 190. Therefore, advantageously, sliding support 192, catch lever 194, and, consequently, drawer 125, may only be withdrawn from and inserted to cabinet 120 when drawer front 132 is in the closed position, when locking pin 202 is received in locking notch 204, and catch lever 194 is in the disengaged position. This prevents damage from occurring to drawer front 132 or freezer door 130 when attempting to insert drawer 125 into cabinet 120 when drawer front 132 is in the open position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drawer assembly for an appliance defining a vertical direction, a lateral direction, and a transverse direction, the appliance comprising a cabinet defining a drawer recess, the drawer assembly comprising:
    a drawer front rotatable between an open position and a closed position for providing selective access to the drawer recess;
    a handle assembly attached to the drawer front; and
    a slide assembly operably coupling the drawer front to the cabinet, the slide assembly comprising
        a fixed slide mounted to the cabinet, the fixed slide defining a receiving slot, and wherein the fixed slide comprises a plurality of notches spaced along the transverse direction;
        a sliding support slidably coupling the drawer front to the fixed slide; and
        a catch lever operably coupled to the fixed slide and the sliding support, the catch lever comprising a locking tab and being movable between an engaged position where the sliding support is fixed relative to the fixed slide and a disengaged position where the sliding support is slidable relative to the fixed slide, wherein the locking tab is received within one of the plurality of notches when the drawer front is in the open position and the sliding support is in the engaged position.

2. The drawer assembly of claim 1, wherein the slide assembly further comprises an actuating mechanism for releasing the catch lever from the engaged position, the actuating mechanism comprising a plunger assembly extending through the drawer front and contacting the catch lever.

3. The drawer assembly of claim 2, wherein the catch lever comprises:
    a first end proximate the drawer body; and
    a second end opposite the first end;
    wherein the locking tab extends from the catch lever proximate the second end, and wherein the catch lever is rotatable about a lateral axis extending in the lateral direction.

4. The drawer assembly of claim 3, wherein a first portion of a top edge of the first end of the catch lever is angled such that a first point of the top edge proximate the drawer front is lower than a second point of the top edge in the vertical direction.

5. The drawer assembly of claim 4, wherein the plunger assembly contacts the first portion of the top edge of the first end of the catch lever.

6. The drawer assembly of claim 4, wherein the drawer front comprises a locking pin protruding in the first lateral direction and the catch lever comprises a locking notch defined in the top edge of the catch lever, and wherein the locking pin is receivable within the locking notch.

7. The drawer assembly of claim 3, wherein the sliding support further comprises a resilient member configured to bias the second end of the catch lever in the vertical direction.

8. The drawer assembly of claim 2, wherein the handle assembly comprises:
    a handle body extending in the lateral direction,
    a connecting post extending in the transverse direction and connecting the handle body to the drawer front;
    a rod movably provided in the handle body; and
    a trigger mechanically coupled to the rod, wherein the trigger is configured to move the rod in the lateral direction within the handle body.

9. The drawer assembly of claim 8, wherein the rod is configured to move the plunger assembly in the second direction toward the catch lever.

10. The drawer assembly of claim 8, wherein the trigger comprises a push lever provided in the handle body and defining a slot angled with respect to the handle body.

11. The drawer assembly of claim 10, wherein the rod comprises a trigger pin positioned in the slot, and wherein when the push lever is pushed, the trigger pin is moved laterally to move the rod in the first direction within the handle body.

12. The drawer assembly of claim 8, wherein the handle body further comprises a resilient member biasing the rod in the first lateral direction toward the trigger.

13. The drawer assembly of claim 8, wherein the plunger assembly comprises a first plunger bar mechanically coupled to the rod and a second plunger bar mechanically coupled to the catch lever, wherein the first plunger bar abuts the second plunger bar within the connecting post.

14. The drawer assembly of claim 13, further comprising a resilient member biasing the plunger assembly in the transverse direction toward the handle body.

15. The drawer assembly of claim 8, wherein the rod comprises a protrusion protruding radially from the rod and positioned at the plunger assembly.

16. The drawer assembly of claim 1, wherein the drawer front is pivotally mounted to the sliding support.

17. A refrigerator appliance defining a vertical direction, a lateral direction, and a transverse direction, the refrigerator appliance comprising:

a cabinet defining a fresh food storage chamber and a frozen food storage chamber;

a drawer slidably mounted within one of the fresh food storage chamber and the frozen food storage chamber and defining a drawer recess, wherein the drawer comprises:

a drawer front rotatable between an open position and a closed position for providing selective access to the drawer recess;

a handle assembly attached to the drawer front; and a slide assembly operably coupling the drawer to the cabinet, the slide assembly comprising         a fixed slide mounted to the cabinet, the fixed slide defining a receiving slot, and wherein the fixed slide comprises a plurality of notches spaced along the transverse direction;

a sliding support slidably coupling the drawer front to the fixed slide; and         a catch lever operably coupled to the fixed slide and the sliding support, the catch lever comprising a locking tab and being movable between an engaged position where the sliding support is fixed relative to the fixed slide and a disengaged position where the sliding support is slidable relative to the fixed slide, wherein the locking tab is received within one of the plurality of notches when the drawer front is in the open position and the sliding support is in the engaged position.

18. The refrigerator appliance of claim 17, wherein the slide assembly further comprises an actuating mechanism for releasing the catch lever from the engaged position, the actuating mechanism comprising a plunger assembly extending through the drawer front and contacting the catch lever.

19. The refrigerator appliance of claim 18, wherein the catch lever comprises:

a first end proximate the drawer body;

a second end opposite the first end;

wherein the locking tab extends from the catch lever proximate the second end, and wherein the catch lever is rotatable about a lateral axis extending in the first lateral direction.

\* \* \* \* \*